July 29, 1924.

H. P. KRAFT

VALVE FOR ATOMIZER BULBS OR THE LIKE

Filed Oct. 20, 1921

1,502,786

Inventor:
Henry P. Kraft,
By Attorneys,

Patented July 29, 1924.

1,502,786

UNITED STATES PATENT OFFICE.

HENRY P. KRAFT, OF RIDGEWOOD, NEW JERSEY.

VALVE FOR ATOMIZER BULBS OR THE LIKE.

Application filed October 20, 1921. Serial No. 509,069.

*To all whom it may concern:*

Be it known that I, HENRY P. KRAFT, a citizen of the United States of America, residing in Ridgewood, in the county of Bergen and State of New Jersey, have invented certain new and useful Improvements in Valves for Atomizer Bulbs or the like, of which the following is a specification.

This invention relates to valves for atomizer bulbs or similar structures, and aims to provide certain improvements therein.

In an atomizer, the bulb which constitutes the air pump is provided, usually at its rear end, with an inlet opening which is controlled by a check valve which closes automatically when the air is forced out of the forward end. Such valves have usually been uncertain in their action and have lacked durability, so that they have been a source of considerable trouble. Frequently they are inaccessible for purposes of repair, and when out of order the entire atomizer is rendered useless.

According to the present invention I provide a cheap and simple construction of valve which is very positive in its action and durable in use. Contrary to general practice, the valve is composed mainly of metal, being, however, provided with a rubber gasket of approved form which seats in the barrel of the casing by the pressure of air when the bulb is collapsed in use.

According to the drawings which illustrate one form of the invention,

Figure 1:
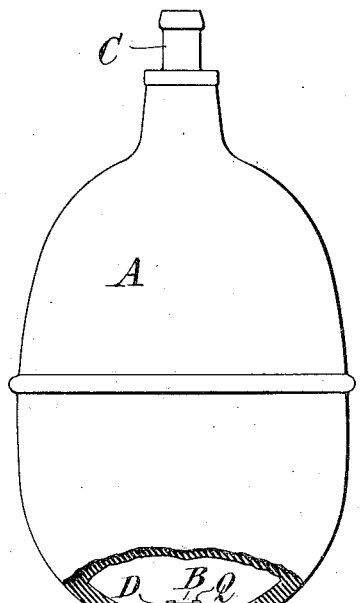
Figure 1 is an elevation of a conventional bulb showing the valve in elevation.
Figure 3:
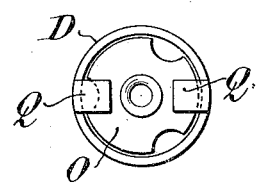
Fig. 3 is a top view of the valve.

Referring to the drawings, let A indicate the bulb having at its outer or rear end the valve B. The bulb is usually provided with a nozzle C for connection with the short length of tubing leading to the atomizer nozzle.

The valve B comprises a casing or barrel D which is best formed with a groove E and flange F, the groove receiving the rubber walls of the bulb, and the casing being held in place by the grip of the rubber walls.

Figure 2:
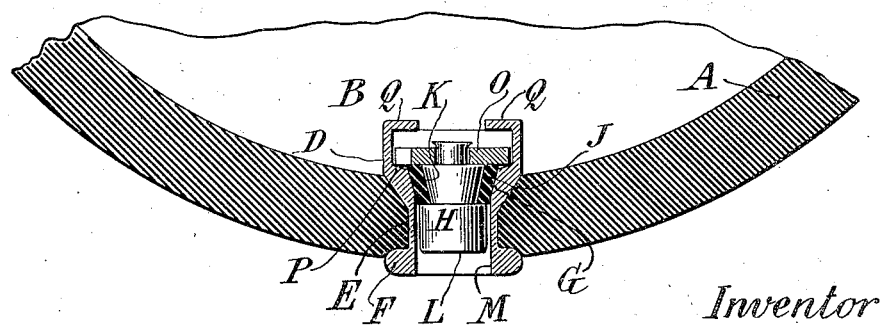
Fig. 2 is an enlarged sectional view of the valve.

Interiorly the valve is provided with a seat G, which is shown as tapered on its interior, and is designed to coact with the check valve H. The latter is provided with a packing washer J, also of tapered form, which is confined in a groove K best shown in Fig. 2. The valve is also provided with a projection or tail L which extends into the restricted portion M of the casing and guides the valve in its movements. To guide the valve within the casing, I prefer to provide a plate O which may be perforated or notched, and which is riveted to the valve at its top. This plate constitutes a guide, being constructed to loosely fit the interior of the valve casing. One or more lugs Q are best provided for engaging the plate O to prevent the valve from falling out of the casing. The plate O should not be too small since its principal function is to guide the valve within the casing while permitting the necessary movements. That part of the casing in which the plate O moves is preferably enlarged as shown at P.

The construction shown provides a valve which is simple and durable in structure and cheap in construction. The provision of a conical washer tends to prevent the enlargement of the packing so as to fill up the clearance, as frequently happens in present constructions. It will also be observed that the washer is held at the top and bottom, which also tends to prevent distortion. Preferably also, the washer is vulcanized to the valve body so that it tends, for this reason, to maintain its position on the latter.

While I have shown and described one form of the invention, it will be understood that I do not wish to be limited thereto, since various changes may be made therein without departing from the spirit of the invention.

What I claim is:—

1. A combination of an atomizer bulb or the like and a valve comprising a casing substantially entirely enclosed within the bulb and having a tapered seat, a check valve having a tapered packing adapted to engage said seat and means for holding the valve within the casing.

2. A combination of an atomizer bulb or the like and a valve comprising a casing substantially entirely enclosed within the bulb and having a groove for receiving the wall of the bulb, an internally tapered seat and a constricted portion leading outwardly from said seat, a check valve in said casing having a tapered packing, a guide plate at the end of said check valve, and lugs holding said check valve in the casing.

3. A combination of an atomizer bulb or the like and a valve comprising a casing, a check valve having a projecting portion working in a restricted portion of the casing, and a guiding plate at the opposite end of the check valve working in an enlarged portion of the casing.

4. A combination of an atomizer bulb or the like and a valve comprising a casing substantially entirely enclosed within the bulb and having a seat, a check valve having a tapered packing, and a plate above said packing for holding the packing in place.

In witness whereof, I have hereunto signed my name.

HENRY P. KRAFT.